Aug. 1, 1944.  H. A. STRICKLAND, JR  2,354,714
METHOD AND APPARATUS FOR HEATING THERMOPLASTICS
Filed Oct. 17, 1941
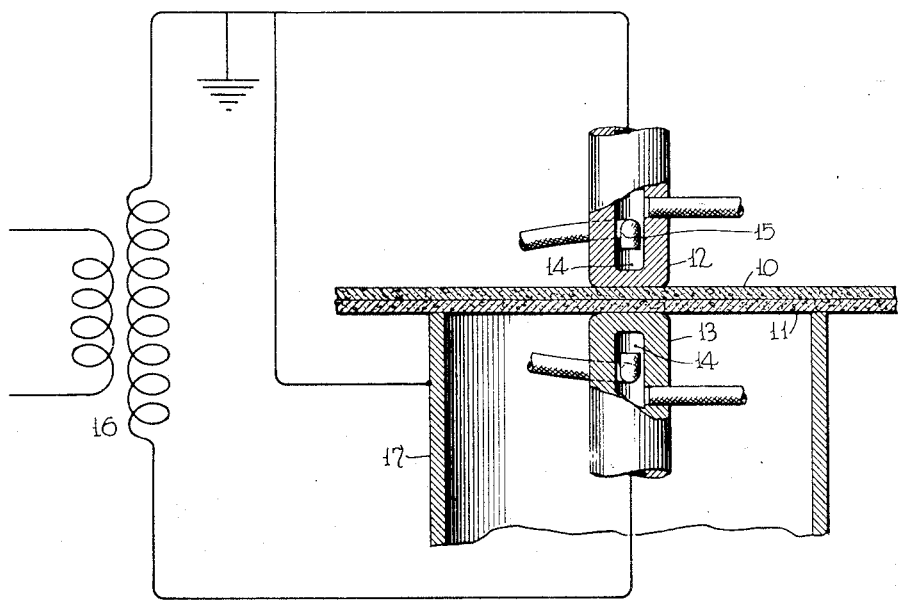
INVENTOR
Harold A. Strickland, Jr.
BY
ATTORNEY

UNITED STATES PATENT OFFICE 2,354,714

METHOD AND APPARATUS FOR HEATING THERMOPLASTICS

Harold A. Strickland, Jr., Detroit, Mich., assignor to Budd Wheel Company, Philadelphia, Pa., a corporation of Pennsylvania Application October 17, 1941, Serial No. 415,342

14 Claims. (Cl. 219—47)

This invention relates to usefully heating plastic dielectric material and especially to the heating of contiguous faces of sheets of such material for effecting a heat sealing or molecularly bonding operation, or a spot welding under pressure by means of heat developed internally followed by subsequent homogeneous resolidification of the material in the weld area.

An object is to provide a method and apparatus for conveniently accomplishing this result.

Another object is to effect a heat sealing of plastic sheets without having their outer surfaces impaired by the heat.

Referring to the drawing the single figure shows a section through one embodiment of this invention.

The contiguous plastic sheets 10 and 11 are placed between the electrodes 12 and 13. Each electrode is provided with a passage 14 for cooling fluid supplied through the inner pipe 15. These electrodes may be of any desired shape and extent where very high frequency, high voltage or potentials are supplied to the electrodes from the secondary of the transformer 16. Any convenient and known means may be provided for pressing the electrodes against the work. The electrode 12 is preferably grounded as is also a cylindrical shield 17 surrounding the high potential electrode 13. This grounded shield around the high potential electrode is a safety factor for the protection of the operator where this work is carried on by a portable tool. The current for supplying the high potential electrode is preferably by means of a duplex conductor of the type in which an inner high potential conductor is well insulated from a surrounding substantially concentric return and grounded conductor. The outer grounded conductor may be of braided copper or other metal to provide flexibility of the supply cable. The inner conductor may be solid or stranded.

In operation, a spot or seam may be welded in two thermoplastic sheets by means of the heat generated by the power absorbed in the plastic sheets, such heat tending to soften the plastic material away from the electrodes, since the electrodes are cooled and conduct heat from the outer surfaces of the sheet. This provides a temperature gradient which slopes downward adjacent the outer surfaces for the purpose of preserving the outer surface from softening, whereas the inner surfaces soften and fuse together. Of course, if seam welding is desired the electrodes will be elongated to the desired extent whereas if heating over only a spot or small area is desired the electrodes may be reduced in area or they may be rounded to a hemispherical shape. The grounded shield 17 provides a grounded annular ring around the high voltage electrode on the plastic surface. Therefore, if there should be any conducting material on the plastic surface it would be raised to a high potential only within the grounded shield 17.

Frequencies of about 40 megacycles have been contemplated though a wide variety of frequencies may be used. The voltage on the electrode should be as high as may be done with safety to avoid the possibility of a breakdown. In other words, the voltage used must be below that at which the insulation might break down or be punctured by the type of electrodes used, by a suitable amount for the sake of safety. The heating developed in the work is proportional to the volt-ampere rating of the capacitance of the heating electrodes multiplied by the loss factor of the material. The volt-ampere rating is directly proportional to the frequency, to the capacitance of the electrodes in vacuum, and to the square of the root-mean-square voltage applied to the electrodes. The loss factor is a material characteristic and is equal to the power factor of the material multiplied by its dielectric constant. Any suitable plastic material may be used which is of the type that is adapted to soften and melt under heat. There are many types of natural and synthetic resins and other well known types of plastics which are suitable. A cellulose acetate thermoplastic known as Tenite is but one example. Another example is a non-polymerized natural resin like shellac. Both thermoplastic and thermosetting materials may be used, the former including plastics that soften and melt with heat, recurrently, and the latter including plastics which soften with heat and then permanently harden.

The larger field of plastics which have become thermo-set or polymerized by heat, such as the numerous phenolic and urea resins may be depolymerized by means of high frequency mechanically supersonic vibrations such as may result from an electrically driven quartz crystal. When such mechanical vibrations are applied by the tool of this invention the polymerized plastics may be depolymerized sufficiently to be subsequently welded as has hereinbefore been described. The pressures used between the electrodes and the surface of the work is such as to cause surface heating of the work to be a minimum.

The claims of this application are directed primarily to the welding together of separate masses or plates of plastic material having dielectric properties, by high frequency electric currents. In my copending application Serial No. 506,480, filed October 16, 1943, claims are directed to heat treatment of single dielectric masses and to broad features related to the disclosures of both applications.

I claim:

1. The process of heat sealing layers of similar pressing high frequency electrodes upon opposite sides of said layers at a high potential difference less than enough to cause breakdown of dielectric strength of said layers, said frequency being high enough to effect the desired heating, and pressing the heated layers to enhance their bond.

2. The method of bonding similar layers of plastic dielectric material which is not tacky enough to be united at ordinary temperatures which comprises cooling the outer surfaces of said layers while simultaneously heating the material between the cooled surfaces to a temperature sufficient to molecularly unite them.

3. The method of heat sealing similar layers of plastic dielectric material which is not tacky enough to be united by pressure at room temperature, and which comprises internally heating the layers between contiguous high frequency electrodes at lower than breakdown potential to a temperature sufficient to effect a bond between said layers while substantially simultaneously pressing said electrodes against said layers and cooling at least one layer surface contiguous an electrode to preclude distortion of such surface longitudinally of the bond between them.

4. An apparatus for heating a plastic dielectric material comprising a pair of high voltage high frequency electrodes, one of which is grounded, the other electrode being ungrounded, but having around it a grounded metal shield extending away from the surface of the material.

5. An apparatus for heating a plastic dielectric material comprising a pair of high voltage high frequency electrodes, one of which is grounded, the other electrode being ungrounded, but having around it a grounded metal shield extending away from the surface of the material, said electrode shield being pressed against the surface of the insulating material, and means for cooling the electrodes.

6. A method of welding two insulating materials of the type which have been set or polymerized by heat which comprises applying supersonic mechanical vibrations to restricted adjacent areas of the material to depolymerize the same at least to some extent and then welding the depolymerized areas by heat sealing them with high potential currents applied thereto of a frequency high enough to generate sufficient heat for welding the materials.

7. The method of joining similar members of thermoplastic dielectric material which is not tacky at ordinary temperatures which comprises overlapping said members at least in part, pressing said overlapped portions together by means of fluid cooled opposite electrodes bearing against outer surfaces of said members, and heating the members between the electrodes to a temperature and for a time sufficient to fuse the material between said electrodes by means of high frequencies of high potential applied to the electrodes while said electrodes are cooling the outer surface of said members whereby the inner faces of said members between the electrodes are heated to a higher temperature than the outer surfaces contiguous the electrodes.

8. The method of uniting overlapped similar mmebers of thermoplastic insulating material which are not tacky at ordinary temperatures which comprises pressing and heating a lapped portion of the members by means of opposite electrodes at a high potential for a sufficient time to fuse portions of their meeting faces while simultaneously cooling the outer faces of the sheets adjacent the electrodes.

9. In a method of joining a member of thermoplastic dielectric material to another similar member which members are not tacky at ordinary temperatures, the steps of overlapping said members at least in part, pressing said overlapped portions together by means of opposite electrodes bearing against outer surfaces of said members while fluid cooling the electrodes, and heating the members between the electrodes to a temperature and for a time sufficient to fuse the material between said electrodes by means of high frequencies of high potential being applied to the electrodes while said electrodes are cooling the outer surface of said members whereby the inner faces of said members between the electrodes are heated to a higher temperature than the outer surfaces contiguous the electrodes.

10. The method of bonding a layer of plastic dielectric material to another similar layer which layers are not tacky enough to be united at ordinary temperatures, which method comprises cooling the outer surface of at least said first-named layer while simultaneously heating the plastic material beneath the cooled surface to a temperature sufficient to cause intimate bonding of the material of said first layer to said second layer.

11. A method of welding two insulating materials at least one of the materials being of the type which have been set or polymerized by heat, which method comprises applying supersonic mechanical vibrations to restricted adjacent areas of the heat-set or -polymerized material to depolymerize the same at least to some extent and then welding the materials at the depolymerized areas by heat sealing them with high potential currents applied thereto of a frequency high enough to generate sufficient heat for welding the materials.

12. The method of uniting normally non-adhesive and non-conductive bodies by integration through fusion and pressure and without interposition of an adhesive substance which comprises pressing the bodies together while simultaneously electrically heating the inner contiguous surfaces to a plastic state and maintaining the outer heat adjacent body surfaces below the plastic state.

13. The process of bonding sections of homogeneous plastic dielectric material which comprises placing such sections in contact and subjecting the contacting material to alternating electrical stresses to plasticize and integrate the same while simultaneously maintaining the outer adjacent sections of material below plasticizing temperatures.

14. A method of uniting plastic non-adhesive and non-conductive bodies of similar composition by integration through fusion and pressure without the interposition of an adhesive substance which comprises pressing the bodies together while simultaneously subjecting these bodies at the point of pressure to electrical oscillations within a range including 40 megacycles and a potential less than the dielectric breakdown potential of the bodies.

HAROLD A. STRICKLAND, Jr.